United States Patent
Agarwal et al.

(10) Patent No.: US 6,618,435 B1
(45) Date of Patent: Sep. 9, 2003

(54) METHOD FOR MEASUREMENT AND REDUCTION OF FREQUENCY OFFSETS IN DISTRIBUTED SATELLITE/WIRELESS NETWORKS AND CORRESPONDING COMMUNICATIONS SYSTEM

(75) Inventors: Anil K. Agarwal, Gaithersburg, MD (US); Charles Richard Thorne, Rohrersville, MD (US)

(73) Assignee: Comsat Corporation, Bethesda, MD (US)

( * ) Notice: Subject to any disclaimer, the term of this patent is extended or adjusted under 35 U.S.C. 154(b) by 0 days.

(21) Appl. No.: 09/381,682

(22) PCT Filed: Oct. 20, 1998

(86) PCT No.: PCT/US98/21637

§ 371 (c)(1),
(2), (4) Date: Nov. 23, 1999

(87) PCT Pub. No.: WO99/21290

PCT Pub. Date: Apr. 29, 1999

Related U.S. Application Data

(60) Provisional application No. 60/062,497, filed on Oct. 20, 1997, provisional application No. 60/064,673, filed on Oct. 20, 1997, and provisional application No. 60/062,496, filed on Oct. 20, 1997.

(51) Int. Cl.[7] .......................... H04B 3/46; H04B 17/00; H04Q 1/20

(52) U.S. Cl. ....................................................... 375/226
(58) Field of Search ................................. 375/226, 219, 375/326, 327, 344; 455/12.1, 13.1, 13.2, 164.1, 165.1, 182.2, 182.1

(56) References Cited

U.S. PATENT DOCUMENTS

| | | | | |
|---|---|---|---|---|
| 4,901,368 A | * | 2/1990 | Arnold et al. | 455/12 |
| 4,932,070 A | | 6/1990 | Waters et al. | 455/10 |
| 5,613,193 A | * | 3/1997 | Ishikawa et al. | 455/12.1 |
| 5,661,765 A | | 8/1997 | Ishizu | 375/376 |

* cited by examiner

Primary Examiner—Mohammad H. Ghayour
(74) Attorney, Agent, or Firm—Sughrue Mion, PLLC

(57) ABSTRACT

A method and device for measurement and reduction of frequency offset in a communication network having a master reference terminal and at least one terminal exchanging reference and control bursts includes steps for adjusting demodulator frequency in the terminal responsive to a first frequency error between a first nominal frequency value and a respective reference burst received by the terminal, and adjusting modulator frequency at the terminal responsive to a second frequency error between a second nominal frequency value and a control burst generated by the master reference terminal and transmitted to the terminal.

29 Claims, 9 Drawing Sheets

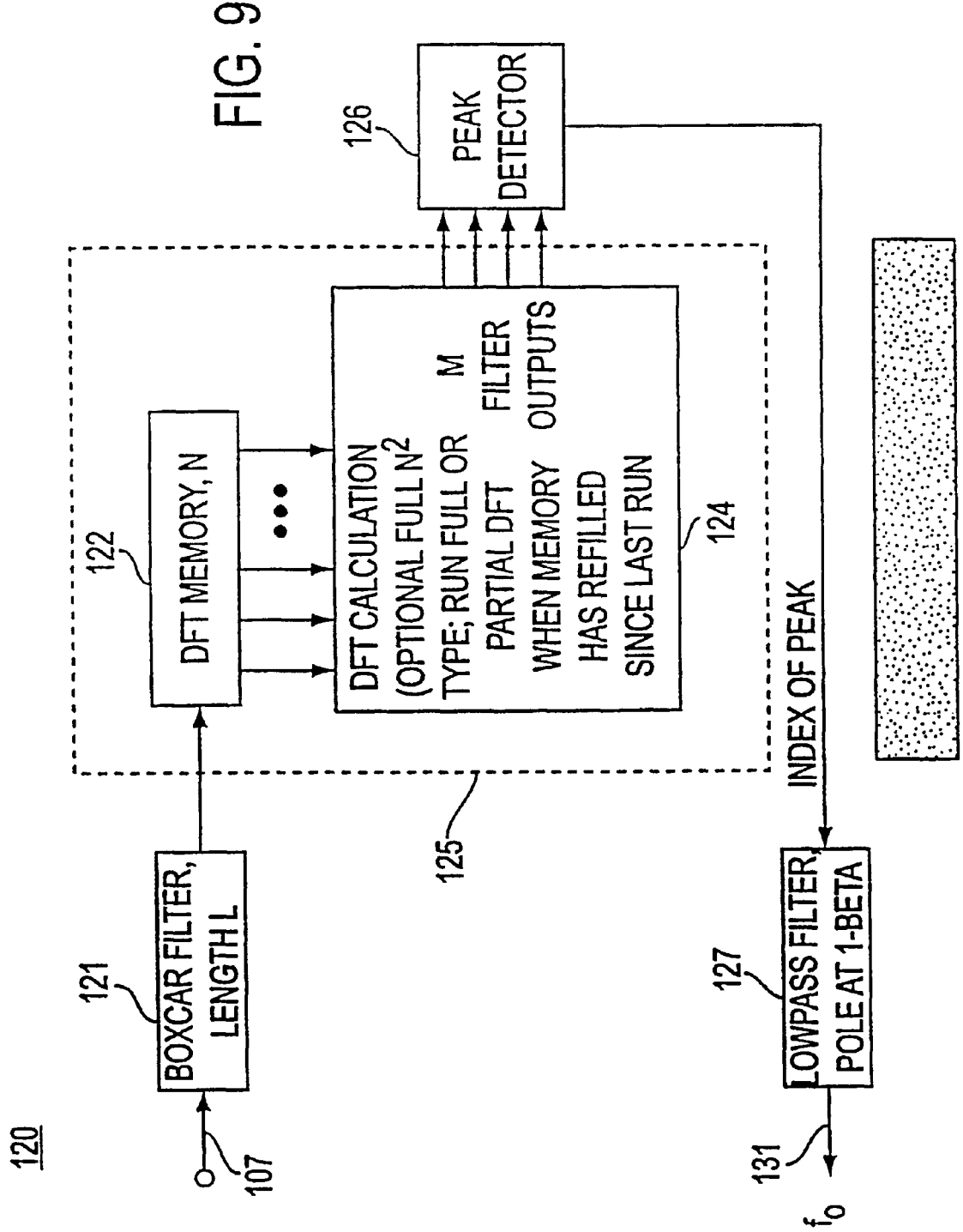

METHOD FOR MEASUREMENT AND REDUCTION OF FREQUENCY OFFSETS IN DISTRIBUTED SATELLITE/WIRELESS NETWORKS AND CORRESPONDING COMMUNICATIONS SYSTEM

This application is based on and claims priority from provisional patent applications, Ser. Nos. 60/062,497 filed Nov. 20, 1997, 60/064,673 filed Nov. 20, 1997, and 60/062, 496 filed Nov. 20 1997, which are incorporated herein by reference for all purpose.

BACKGROUND OF THE INVENTION

The present invention relates generally to methods for minimizing the frequency offset between satellite or wireless network components. More specifically, the present invention relates to method for measuring and reducing frequency offsets in distributed satellite and/or wireless networks. A corresponding system is also disclosed.

In a distributed satellite/wireless network based on Frequency/Time Division Multiple Access (FDMA, TDMA) technology, traffic terminals transmit data to one another in short bursts. Each terminal uses a local clock to generate carrier frequencies for transmission and reception of bursts. Due to a number of factors, the frequency at which a terminal transmits a signal is different than the frequency at which the signal is actually received at a destination terminal. This difference in frequency can be as high as 20 KHz. It will be noted, that this mismatch in frequency can have a large impact on the performance and reliability of the reception of a burst. In general, the larger the difference between the received frequency and the expected frequency, the larger is the probability of missing the burst or of detecting the burst but introducing bit errors in the process. Similar problems exist with respect to CDMA, i.e., Code Division Multiple Access, systems.

More specifically, the frequency mismatch between terminals is caused by the following factors:

(1) The up-converter equipment at the transmitter;
(2) The down-converter and up-converter equipment at the satellite;
(3) The down-converter equipment at the receiver; and
(4) The satellite Doppler caused by satellite motion.

It will be appreciated that most of these factors cause a time-varying change in frequency offset. For example, relatively rapid changes in frequency offset can occur due to temperature changes. Moreover, relatively slow changes in frequency offset can be attributed to equipment, e.g., terminal, aging.

Traditionally, this problem has been solved by designing satellite/wireless burst demodulators that are capable of handling large frequency offsets. It will be noted that this results in a more complex and expensive modem implementation. It should also be mentioned that this may dictate that transmission power levels be high so as to maximize burst recognition, which leads to further system complexities. For example, U.S. Pat. No. 5,619,525 to Wiedeman et al. discloses a method of operating a satellite communication system, which method provides adaptive closed loop power control. First, the ground station transmits an uplink reference signal with a first frequency to the satellite. The uplink reference signal experiences an attenuation between the ground station and the satellite due to, for example, a rain cell. The satellite then receives the reference signal and repeats the reference signal at a second frequency as a downlink reference signal that is transmitted from the satellite. The second frequency is less than the first frequency and is not significantly impaired or attenuated by the rain cell. The downlink reference signal is transmitted with a power that is a function of the power of the received uplink reference signal. Then, the downlink reference signal is received and used to determine the amount of attenuation that was experienced at least by the uplink reference signal between the ground station and the satellite. Thereafter, the transmitted power of the uplink reference signal is adjusted in accordance with the determined amount of attenuation so as to substantially compensate for the experienced attenuation. It would be preferable to avoid such complexities.

What is needed then is a method for minimizing frequency offsets in satellite networks and the like. U.S. Pat. No. 5,613,193 to Ishikawa et al., which is incorporated herein by reference, discloses a system and method for frequency offset compensation in a satellite mobile communication system. Frequency offset compensation is carried out by an Enhanced Automatic Frequency Control (EAFC) system in which a pilot (reference) signal is sent by a reference earth station physically separated from a land earth station. Using the pilot control signal, the land earth station measures the frequency offset in a signal received from a mobile earth station through a satellite due to frequency offset using a transponder in the satellite and a local oscillator in the mobile earth station, and the frequency offset due to Doppler shift by movement of the satellite. The land earth station then informs the mobile earth station of the measured frequency offset for controlling the local frequency for communication. Therefore, the Ishikawa et al. reference requires that each pair of terminals communicate and perform frequency measurements with respect to each other. Furthermore, not every terminal in the system proposed by the Ishikawa et al. reference measures frequency offset, i.e., between the mobile land stations.

Thus, what is needed is a method which permits a substantial reduction in the error between the actual received frequency and the frequency programmed at the demodulator. Advantageously, it would be desirable to have a method which permits a maximum error between the actual received frequency and the frequency programmed at the demodulator of several hundred hertz, with Ê100 Hz being considered a realistic maximum frequency error. It will be appreciated that this capability is critical where obtaining adequate performance at low signal-to-noise (SNR) levels is problematic using the conventional frequency error correction techniques discussed above.

SUMMARY OF THE INVENTION

Based on the above and foregoing, it can be appreciated that there presently exists a need in the art for a method for measuring and reducing frequency offset between components of a distributed system which overcomes the above-described deficiencies. The present invention was motivated by a desire to overcome the drawbacks and shortcomings of the presently available technology, and thereby fulfill this need in the art.

An object according to the present invention is to provide a method for measuring and reducing frequency offset in a distributed network, e.g., satellite network or wireless network, which results in a higher performance system. Advantageously, the higher performance system would be characterized by improved burst detection probability with a corresponding lower bit error ratio.

Another object according to the present invention is to provide a method for measuring and reducing frequency offset in a distributed network, e.g., satellite network or wireless network, which results in a lower cost implementation of, for example, the TDMA modem. According to one aspect of the present invention, instead of requiring frequency measurements between every pair of terminals, the inventive method implements an algorithm which requires measurements only between individual terminals and the reference terminal. According to another aspect of the present invention, these measurements are performed using reference and control bursts. It will be noted that this represents a significant departure from conventional method of frequency offset reduction, since the inventive method does not require that each pair of traffic terminals communicate with one another and perform frequency measurements with respect to each other.

Advantageously, the inventive method naturally allows reception of Aloha bursts, where a terminal can receive a burst from any transmitting terminal within a given time slot. Moreover, the method according to the present invention naturally allows transmission of multicast bursts, where multiple terminals can receive a burst from one or more transmitting terminals within a given time slot.

Yet another object according to the present invention is to provide a method for measuring and reducing frequency offset in a distributed network, e.g., satellite network or wireless network, which minimizes the number of parameters that each terminal has to maintain with respect to frequency management.

Still another object according to the present invention is to provide a method for measuring and reducing frequency offset in a distributed network, e.g., satellite network or wireless network, which minimizes the number of bursts dedicated for frequency offset management purposes.

These and other objects, features and advantages according to the present invention are provided by a method for measurement and reduction of frequency offsets in a communications network including a master reference terminal and a terminal exchanging reference and control bursts. Preferably, the method includes steps for adjusting demodulator frequency in the terminal responsive to a frequency error between a nominal frequency value and a respective reference burst received by the terminal, and adjusting modulator frequency at the terminal responsive to a frequency error between a nominal frequency value and a control burst generated by the terminal and transmitted to the master reference terminal.

These and other objects, features and advantages according to the present invention are provided by a method for measurement and reduction of frequency offsets in a communications network including a master reference terminal and N terminals exchanging reference and control bursts via a satellite, including steps for adjusting demodulator frequency in the Nth terminal responsive to a first frequency error between a first nominal frequency value and a respective reference burst received by the Nth terminal, determining a second frequency error between a second nominal frequency value and a control burst, the second frequency error being generated by the master reference terminal, and adjusting modulator frequency at the Nth terminal responsive to the second frequency error.

These and other objects, features and advantages according to the present invention are provided by a method for measurement and reduction of frequency offsets in a communications network including a master reference terminal, a secondary reference terminal, and N terminals exchanging reference and control bursts via a satellite. Advantageously, the method includes steps for adjusting demodulator frequency in the Nth terminal responsive to a first frequency error between a first nominal frequency value and a respective reference burst received by the Nth terminal, determining a second frequency error between a second nominal frequency value and a control burst, the second frequency error being generated by one of the master reference terminal and the secondary reference terminal, and adjusting modulator frequency at the Nth terminal responsive to the second frequency error.

These and other objects, features and advantages according to the present invention are provided by a communications network including a master reference terminal and a terminal exchanging reference and control bursts via a communications channel and having means for measuring and reducing frequency offsets in the terminal of the communications network, wherein a demodulator frequency of the terminal is determined based on a first frequency error between the reference burst and a nominal frequency value determined by the terminal and a modulator frequency of the terminal is established responsive to a second frequency error generated by the master reference terminal with respect to the control burst.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 8 and 9 are high and low level block diagrams, respectively, of conventional frequency offset measurement circuitry which can be utilized with the various preferred embodiments according to the present invention.

DETAILED DESCRIPTION OF THE PREFERRED EMBODIMENTS

Figure 1:
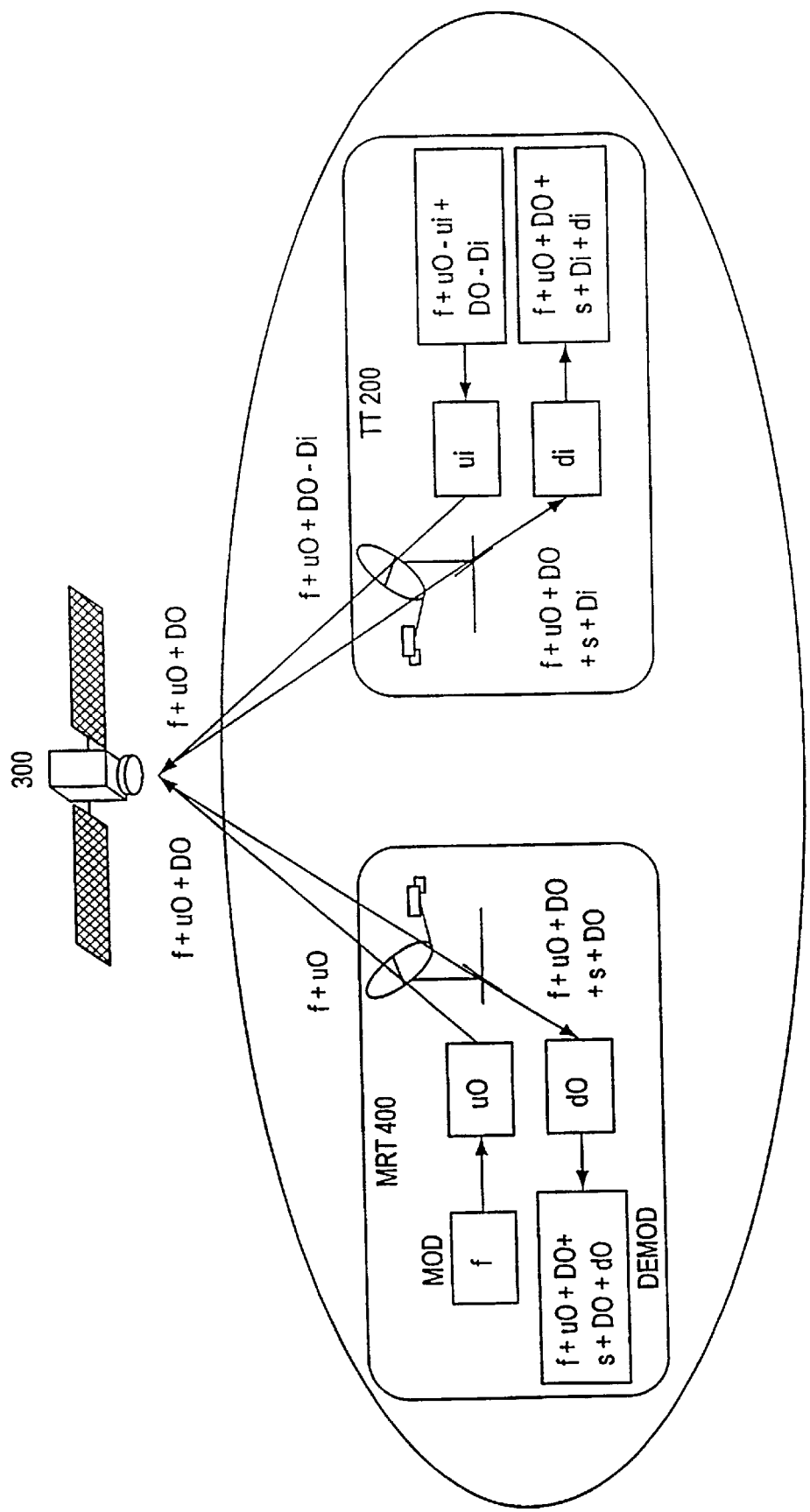
FIG. 1 is a high level, partially block and partially representational, diagram which is useful in understanding the basic operation of the operating method according to the present invention.

Before beginning a detailed discussion of the preferred embodiments of the present invention, a brief discussion of the novel methods according to the present invention will be presented while referring to FIG. 1, wherein a terminal (TT)

200 is operatively connected to a master reference terminal (MRT) 400 via a satellite 300. It should be noted that in the discussion which follows, the definitions listed immediately below are applicable:

| | |
|---|---|
| f | Nominal frequency of a carrier; |
| ui | Frequency error introduced by transmit equipment at terminal i; |
| di | Frequency error introduced by receive equipment at terminal i; |
| Di | Frequency error due to Doppler between satellite and terminal i; |
| u0 | Frequency error introduced by transmit equipment at the MRT; |
| d0 | Frequency error introduced by receive equipment at the MRT; |
| D0 | Frequency error due to Doppler between satellite and the MRT; |
| s | Frequency error introduced by the satellite; |
| RCi | Receive frequency correction factor at terminal i; and |
| TCi | Transmit frequency correction factor at terminal i. |

In the system illustrated in FIG. 1, i.e., a distributed network, each carrier has a nominal frequency f. Each terminal "i" programs its modulator (demodulator) to this frequency fi, when transmitting (receiving) a burst on the given carrier. When the terminal "i" programs the modulator to frequency fi, then the frequency fj "seen" by the demodulator at terminal j is denoted by the following expression:

$$fj=[fi]+[ui+Di+s+dj+Dj].$$

It will be noted that this frequency error component, i.e., the term ui+Di+s+dj+Dj, which can be as high as 20 kHz, plays an important role in demodulator performance. The method according to the present invention introduces a novel approach to dynamically measuring and reducing this frequency offset between the terminals. Preferably, the inventive method uses continuous measurements and corrections of both transmit and receive carrier frequencies so that the frequency offset advantageously can be reduced to 100 Hz, or less. It will be appreciated from the discussion which follows that the method according to the present invention imposes very low overhead on the system capacity. Moreover, the method according to the present invention does not require that every terminal transmit data to every other terminal capable of receiving its transmission, thus eliminating a significant burden on system capacity in a large network. Beneficially, the method according to the present invention naturally compensates for time-varying components of the frequency offset, such as those caused by satellite motion, i.e., Doppler shifts, and those caused by temperature fluctuations and aging in satellite and ground equipment.

The method for measuring and reducing frequency offsets in a distributed network, described in detail below, measures the error components, identified above, and compensates for these error components by inserting a correction factor in the programmed frequency associated with each modulator and the demodulator in such a way that the net frequency error at the demodulator is small. Stated another way, the method for measuring and reducing frequency offset in a distributed network according to the present invention permits computation of error components ui, Di, s, and di for each terminal "i" in the distributed network system. It will be appreciated that this allows each terminal "i" to modify its respective modulator frequency for a burst by a factor of (ui+Di) and its respective demodulator frequency for a burst by a factor of (di+Di). Thus, the frequency f "perceived" at the satellite from any one of the terminals advantageously is equal to f+D0+u0, where the suffix 0 refers to a Reference Terminal, e.g., the MRT 400.

It will be appreciated that the residual frequency error at each terminal "i" is a function of both the frequency measurement accuracy and precision associated with each terminal and any short-term variations in ui, Di, s or di. It is expected that the residual frequency error at any point in the distributed system advantageously will be on the order of 100 Hz; preferably, the residual frequency error at any point in the distributed system will be much less that 100 Hz.

It should be noted that the method for measuring and reducing frequency offset in a distributed network according to the present invention assumes that the value of the parameters ui, Di, s and di, i.e., the error components mentioned above, are constant for a given terminal, even though it will be appreciated that these parameters may change slowly over time. It should also be noted that the method for measuring and reducing frequency offset in a distributed network assumes that these parameters are applicable for all carriers within a transponder, i.e., the method for measuring and reducing frequency offset in a distributed network works on the assumption that the values of these parameters are not a function of the carrier frequency.

It should also be noted that the method for measuring and reducing frequency offset in a distributed network according to the present invention requires that every terminal be able to measure the frequency offset of a received burst, i.e., the difference between the expected or programmed frequency value and the actual received frequency. Moreover, the method for measuring and reducing frequency offset in a distributed network requires that reference stations, e.g., MRT 400, transmit a reference burst which all terminals, e.g., all terminals in a spot beam, receive and use to measure receive frequency offsets. Furthermore, the method of measuring and reducing frequency offset in a distributed network requires that all terminals periodically transmit a control burst to the reference station(s), which control burst advantageously can be employed to measure transmit frequency offsets. It will be appreciated that such control bursts are typically used in satellite/wireless TDMA systems for control, monitoring and timing purposes anyway; hence, the method according to the present invention does not require any additional bursts which would degrade system availability.

Moreover, it will be appreciated that communication system components include structure capable of performing frequency error measurements are known to one of ordinary skill in the art. For example, U.S. Pat. No. 5,640,431, which patent is incorporated herein by reference for all purposes, discloses an offset frequency estimator, which follows a reference information extractor for extracting reference samples from a received signal. The offset frequency estimator includes an acquisition circuit that first filters the reference information to thereby form a filtered reference sequence, then correlates the sequence against a predetermined reference signal, e.g., a sequence or family of candidates in a discrete Fourier transform (DCT) correlator. The output correlation values are then used in determining an offset signal characteristic estimate, e.g., an offset frequency estimate. For DFT processing, the index, e.g., a predetermined value corresponding to a time rate of phase change measure, of the peak output, detected in a peak detector, is passed to a lowpass filter (LPF), the output of which is an initial frequency estimate, $f_0$. When in tracking mode, i.e., after the received signal has been initially acquired, the reference symbol stream is input to a filter and the filtered sequence correlated against a prior sample to determine the phase rotation in a predetermined time interval. The result is lowpass filtered, adjusted according to a prior estimate, yielding a frequency estimate f.

It should be noted that many types of communication systems, e.g., personal communication systems, trunked systems, satellite communication systems, data networks, and the like, can be adapted and/or designed to use the principles described in U.S. Pat. No. 5,640,431. It will also be noted that the circuitry disclosed in U.S. Pat. No. 5,640, 431 is only one of many possible approaches to providing fixed and mobile stations which include a frequency estimation or measurement capability.

Figure 8:
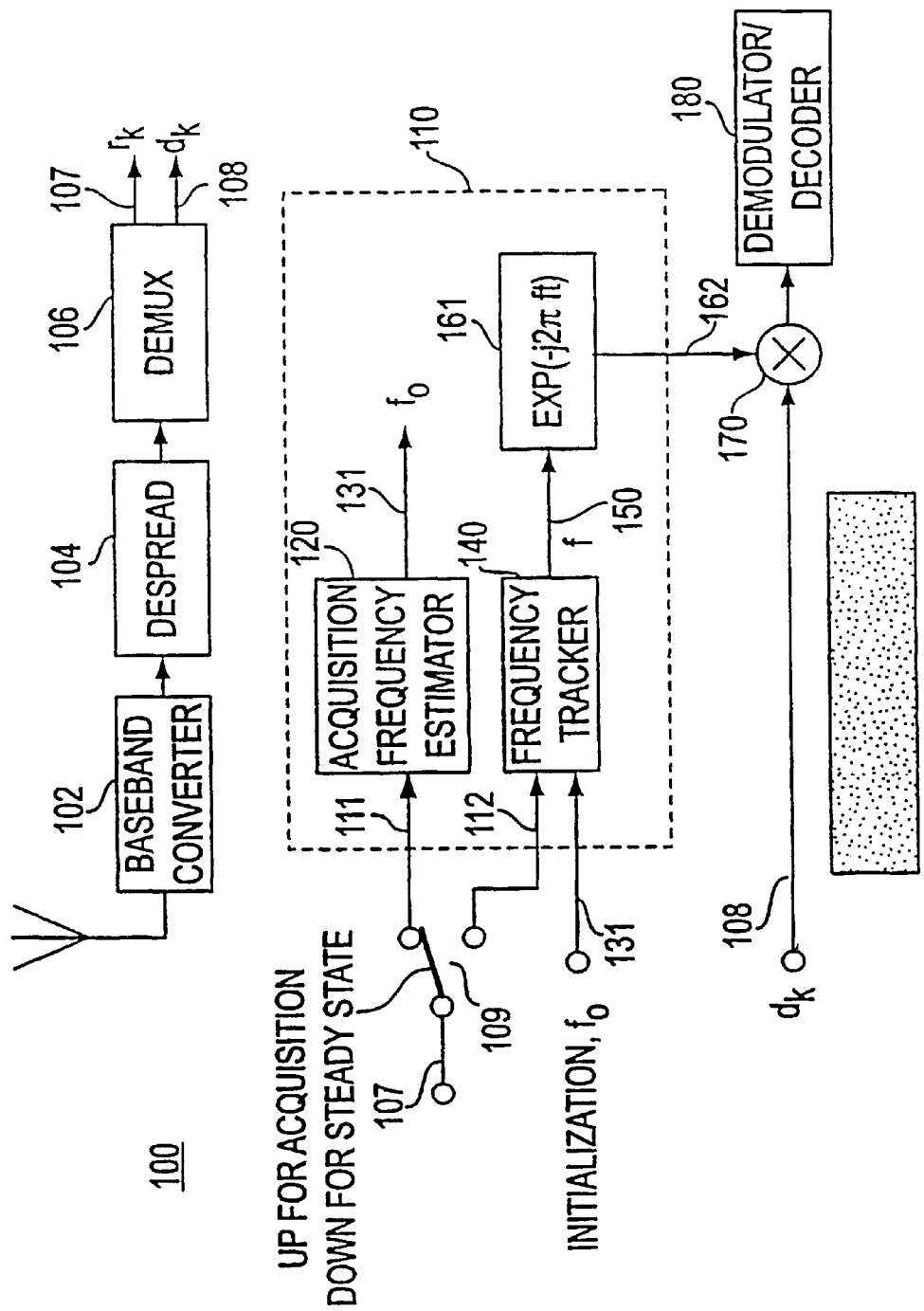

As shown in FIG. 8, which figure was found in U.S. Pat. No. 5,640,431, a coherent receiver 100 includes a baseband converter 102, which receives a reference symbol encoded spread spectrum signal via the antenna of the receiver 100, and which downconverts the signal for further processing at baseband frequencies. Despreader 104 next despreads the signal, and the reference samples 107 are extracted from the signal by reference sample extractor/demultiplexer 106. The reference samples 107 are then fed to frequency estimator/ AFC 110, while the data samples are appropriately delayed for phase rotation by the frequency offset correction output from AFC 110.

During initial acquisition, the reference samples 107 are routed via switch 109 as input 111 to acquisition frequency estimator 120. Acquisition frequency estimator 120, which will be described more fully below, determines an initial frequency estimate $f_0$ 131, which is fed to frequency tracker 140.

It should be mentioned that the inserted reference symbols can be organized in blocks or uniformly distributed. For a flat fading channel, it is desirable to insert reference symbols periodically and uniformly in the data stream. For a DS-CDMA up-link with a RAKE receiver for frontend processing, one can treat the output of each RAKE "finger" as being a flat faded signal. Thus, the communications system will uniformly insert one reference symbol for every Y coded data symbols. Upon acquisition, switch 109 couples reference symbols 107 to frequency tracker 140 via input 112. Frequency tracker 140, which is also described more fully below, determines a frequency offset estimate f 160 based on both $f_0$ 131 and reference sample input 112. The frequency offset estimate 160 is then converted in circuit 161 and fed as frequency correction signal 162 to mixer 170. Mixer 170 serves to adjust the phase/frequency of the data samples 108 prior to processing by demodulator/detector 180.

FIG. 9, also extracted from the '431 patent, illustrates the acquisition frequency estimator 120. The reference samples 107 are first filtered so as to effect averaging, thus reduce aliasing in the downsampled output of filter 121, since the overall despread bandwidth is several times wider than the reference sample bandwidth. Preferably, a boxcar filter 121 operates with a length L over the reference samples 107, although other filters may also be employed. The output of filter 121 is fed to discrete Fourier transform (DFT) memory 122, and then to DFT estimator 124, which together form correlator 125. DFT estimator 124 performs a partial DFT calculation on the DFT memory 122 output. After each computation of DFT estimator 124, the output set D is fed to peak detector 126. The index m of the filter with the peak energy value is determined, and this index m is filtered by filter 127 to reduce the effects of noise.

A first preferred embodiment of the method for measuring and reducing frequency offset in a distributed network according to the present invention will now be described while referring to FIGS. 1 and 2. It should be mentioned that the inventive method is advantageous for systems, i.e., a network with global beams or a network with spot beams, wherein the Master Reference Terminal (MRT) can receive its own transmissions. Such a system is depicted in alternative ways in FIGS. 1 and 2.

Referring first to FIG. 1, the system controlled according to a first embodiment of the novel methods of the present invention consists of a MRT 400 connected to at least one terminal (TT) 200 via a satellite 300. As illustrated in FIG. 2, the terminal 200 preferably includes a modulator 204 for generating a signal of frequency f, operatively coupled to a transmitter 202, which is attached to an antenna (FIG. 1). Advantageously, terminal 200 includes a receiver 206 operatively connected to both the antenna of FIG. 1 and a demodulator 208. All of the components 202, 204, 206, and 208 are controlled by a controller 210, which controller is connected to a memory 212 storing various data values, all of which will be discussed in greater detail below. Preferably, the terminal 200 also includes a frequency measurement circuit 214, the operation on which will be discussed in greater detail below. One non-limiting, possible configuration of the frequency measurement circuit was discussed above.

Figure 2:
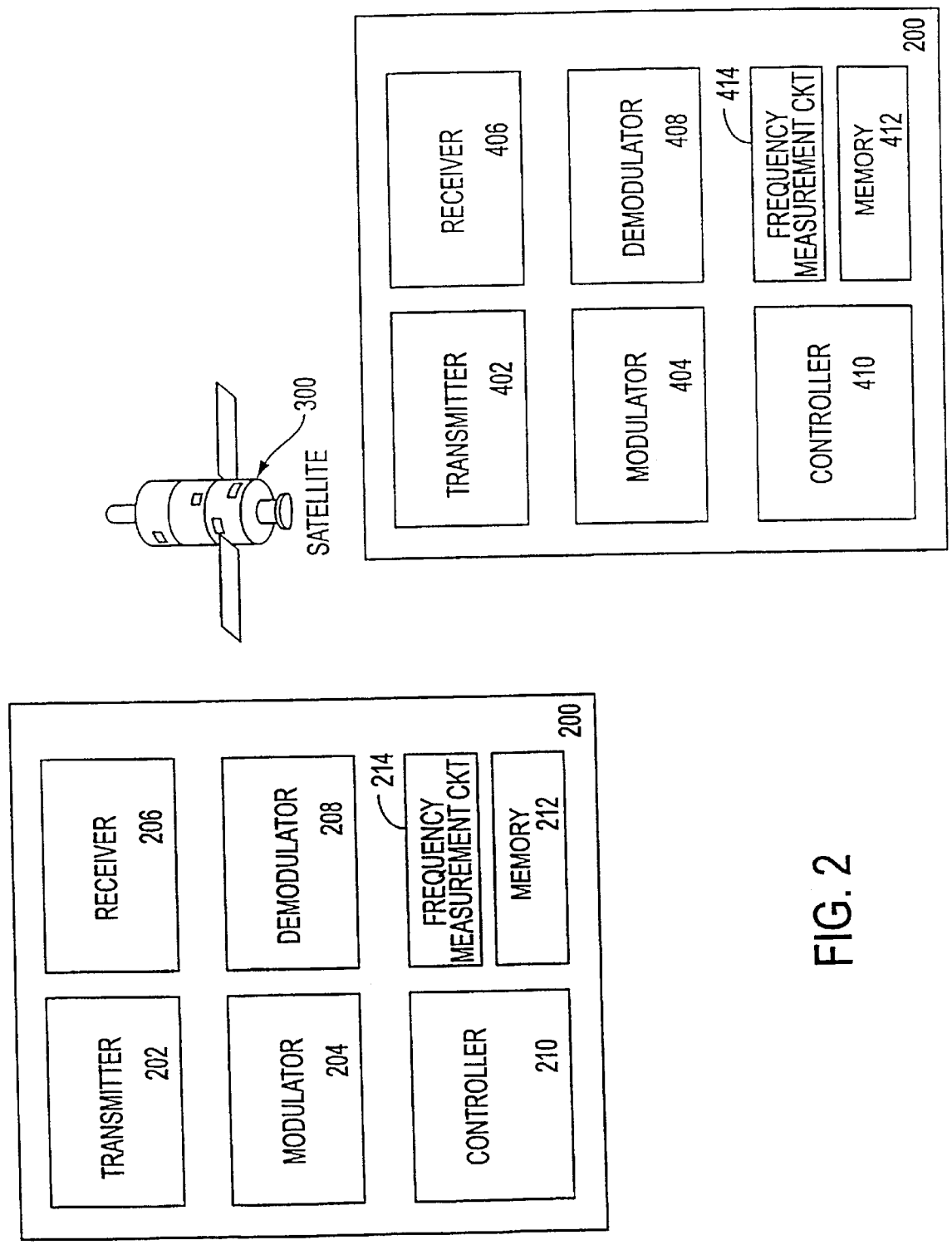
FIG. 2 is a high level block diagram of an exemplary communication network according to the present invention having the construction illustrated in FIG. 1.

Still referring to FIG. 2, the MRT 400 advantageously can include a modulator 404 for generating a signal at a predetermined frequency, which modulator is operatively coupled to a transmitter 402, which is attached to the antenna of FIG. 1. Advantageously, MRT 400 also includes a receiver 406 operatively connected to both the antenna of FIG. 1 and a demodulator 408. All of the components 402, 404, 406, and 408 are controlled by a controller 410, which controller is connected to a memory 412 storing various data values, all of which will be discussed in greater detail below. Preferably, MRT 400 also includes a frequency measurement circuit 414, the operation on which will also be discussed in greater detail below.

During normal operation, the system depicted in FIGS. 1 and 2 operates according to the following rules:

(1) The modulator (transmit) frequency of MRT 400 is set to f, (2) Every terminal i, including MRT 400, has its demodulator (receive) frequency set to (f+RCi), so that the frequency error measured by the demodulator at terminal "i" when receiving a Reference Burst is 0. As will be discussed in greater detail below, the demodulators 208, 408 advantageously can be employed to determine the error between the programmed frequency and the measured frequency of the received Reference Burst and this value beneficially can be used to adjust the value of RCi.

(3) Every terminal i, except the MRT 400, has its transmit frequency set to (f+TCi), so that the frequency error measured by the demodulator at the MRT 400 is 0. It should be noted that the MRT 400 measures the frequency error reported by its demodulator 408 for acquisition and control bursts, and sends the error to the terminal 200, which in turn adjusts the value of TCi.

It can be shown that if all terminals follow the above procedures, then the frequency error measured by terminal j for a burst originating at terminal "i" is substantially zero.

1. RCi=sum of frequency errors introduced by the MRT up converter, the satellite Doppler and the down converter at terminal i $$RCi = u0 + D0 + s + Di + di$$

$$RC0 = u0 + D0 + s + D0 + d0$$

2. TCi is such that the frequency seen by the MRT demodulator is equal to that programmed in the MRT demodulator $$(f + TCi) + (ui + Di + s + D0 + d0) = f + RC0$$

Substituting the value of RC0 from the equation in item 1 produces the expression $$(f+TCi)+(ui+Di+s+D0+d0)=f+(u0+s+d0+2D0)$$

Simplification of the above equation results in $$TCi=u0-ui+D0-Di$$

3. It will be appreciated that the frequency received at the satellite from the MRT is $$=f+u0+D0$$

From 1 and 2, it can be seen that the frequency received at the satellite from any terminal is $$=f+TCi+ui+Di$$

Substituting the value of TCi from the equation in item 2 produces the expression $$f+u0+D0,$$

which is identical to that received from the RT.

Hence, it follows that the frequency seen at the demodulator of any terminal "i" for a burst originating at any terminal is $$=(f+u0+D0)+s+Di+di$$

which is precisely the frequency programmed at the demodulator of terminal i.

Hence, it follows that if terminal "i" transmits to terminal j, the frequency error measured at terminal j will be 0.

Figure 3:
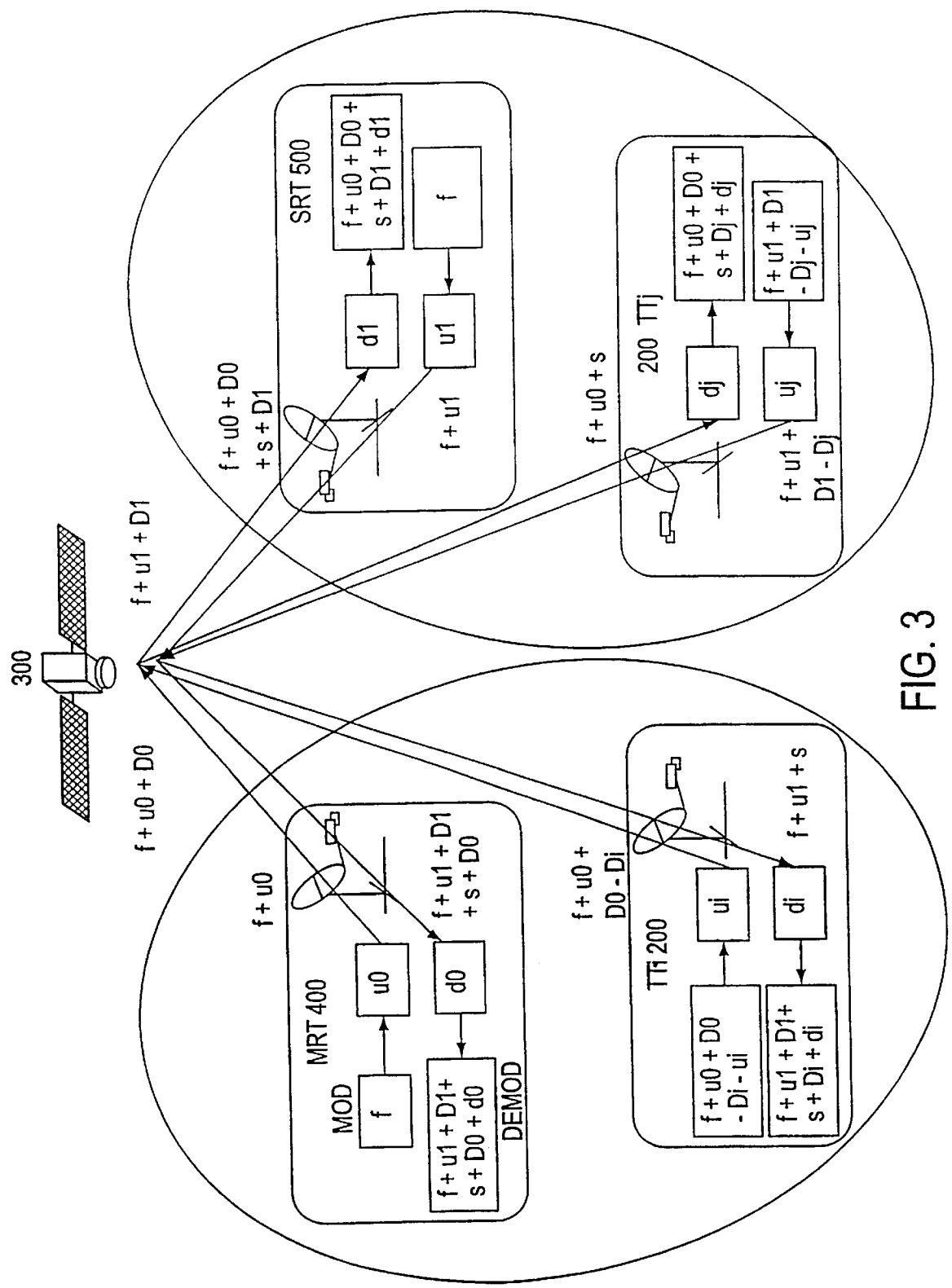
FIG. 3 is a high level, partially block and partially representational, diagram which is useful in understanding a more complex, alternative operating method according to the present invention.

FIG. 3 illustrates an alternative configuration employing both a master reference terminal (MRT) 400 and a Secondary Reference Terminal (SRT) 500. It will be appreciated that the following set of operating procedures are applicable to that network configuration, i.e., a network employing spot beams because the MRT 400 cannot receive its own transmissions but the SRT 500 advantageously can be used to receive transmission from the MRT 400. It will be also appreciated that the MRT 400 can receive transmissions from its corresponding SRT 500.

It should be noted that in the discussion which follows, the definitions listed immediately below are applicable:

| | |
|---|---|
| f | Nominal frequency of a carrier. |
| ui | Frequency error introduced by transmit equipment at terminal i. |
| di | Frequency error introduced by receive equipment at terminal i. |
| Di | Frequency error due to Doppler between satellite and terminal i. |
| u0 | Frequency error introduced by transmit equipment at the MRT. |
| d0 | Frequency error introduced by receive equipment at the MRT. |
| D0 | Frequency error due to Doppler between satellite and the MRT. |
| u1 | Frequency error introduced by transmit equipment at the SRT. |
| d1 | Frequency error introduced by receive equipment at the SRT. |
| D1 | Frequency error due to Doppler between satellite and the SRT. |
| s' | Frequency error introduced by the satellite in the MRT to SRT direction. |
| RCi | Receive frequency correction factor at terminal i. |
| TCi | Transmit frequency correction factor at terminal i. |

During normal operation, the system depicted in FIG. 3 advantageously operates according to the following rules:

(1) The modulator (transmit) frequency of the MRT 400 is set to f (2) For every terminal "i" in the SRT beam, including the SRT 500, the demodulator (receive) frequency is set to (f+RCi), so that the frequency error measured by the demodulator at terminal "i" when receiving a reference burst is 0.

(3) For every terminal "i" in the MRT beam, except the MRT 400, the transmit frequency is set to (f+TCi), so that the frequency error measured by the demodulator at the SRT is 0. It will be appreciated that the SRT 500 measures the frequency error reported by its demodulator for acquisition and control bursts, and sends the error to the respective terminal 200.

(4) The modulator (transmit) frequency of the SRT 500 is set to f.

(5) For every terminal "i" in the SRT beam, including the MRT 400, the demodulator (receive) frequency is set to (f+RCi), so that the frequency error measured by the demodulator at terminal "i" when receiving a reference burst is 0.

(6) For every terminal "i" in the SRT beam, except the SRT 500, the transmit frequency is set to (f+TCi), so that the frequency error measured by the demodulator at the MRT 400 is 0. The MRT measures the frequency error reported by its demodulator for acquisition and control bursts, and sends the error to the terminal.

It can be shown that if all terminals follow the above procedures, then the frequency error measured by terminal j in the SRT beam for a burst originating at terminal "i" in the MRT beam is zero.

1. RCj=sum of the frequency errors introduced by the MRT up converter, Doppler, the satellite and the down converter at terminal j $$RCj=u0+D0+s+Dj+dj$$

$$RCl=u0+D0+s'+D1+d1$$

RC1 is the RC at the SRT

2. TCi is such that the frequency seen by the SRT demodulator is equal to that programmed in the SRT demodulator $$(f+TCi)+(ui+Di+s'D1\ d1)=f+RC1$$

Substituting the value of RC0 from the equation in item 1 produces the expression $$(f+TCi)+(ui+Di+s'+D1\ +d1)=f+(u0+D0+s'+D1+d1)$$

Simplification of the above equation results in $$TCi=u0-ui+D0-Di$$

3. It will be appreciated that the frequency received at the satellite from the MRT is $$=f+u0+D0$$

From items 1 and 2, it can be seen that the frequency received at the satellite from the TTi is $$=f+TCi+ui+Di$$

Substituting the value of TCi from the equation in item 2 produces the expression $$f+u0+D0,$$

which is identical to that received from the MRT.

Hence, it follows that the frequency received at the satellite from any terminal in the MRT beam is $$=f+u0+D0$$

Furthermore, it follows that the frequency seen at each terminal in the SRT beam is $$=(f+u0+D0)+s'+Dj+dj$$

which is precisely the frequency programmed at the demodulator of terminal j.

Moreover, it follows that if terminal "i" transmits to terminal j, the frequency error measured at terminal j will be 0.

4. It can be shown similarly that the frequency received at the satellite from any terminal in the SRT beam is $$=f+u1+D1.$$

Figure 4:
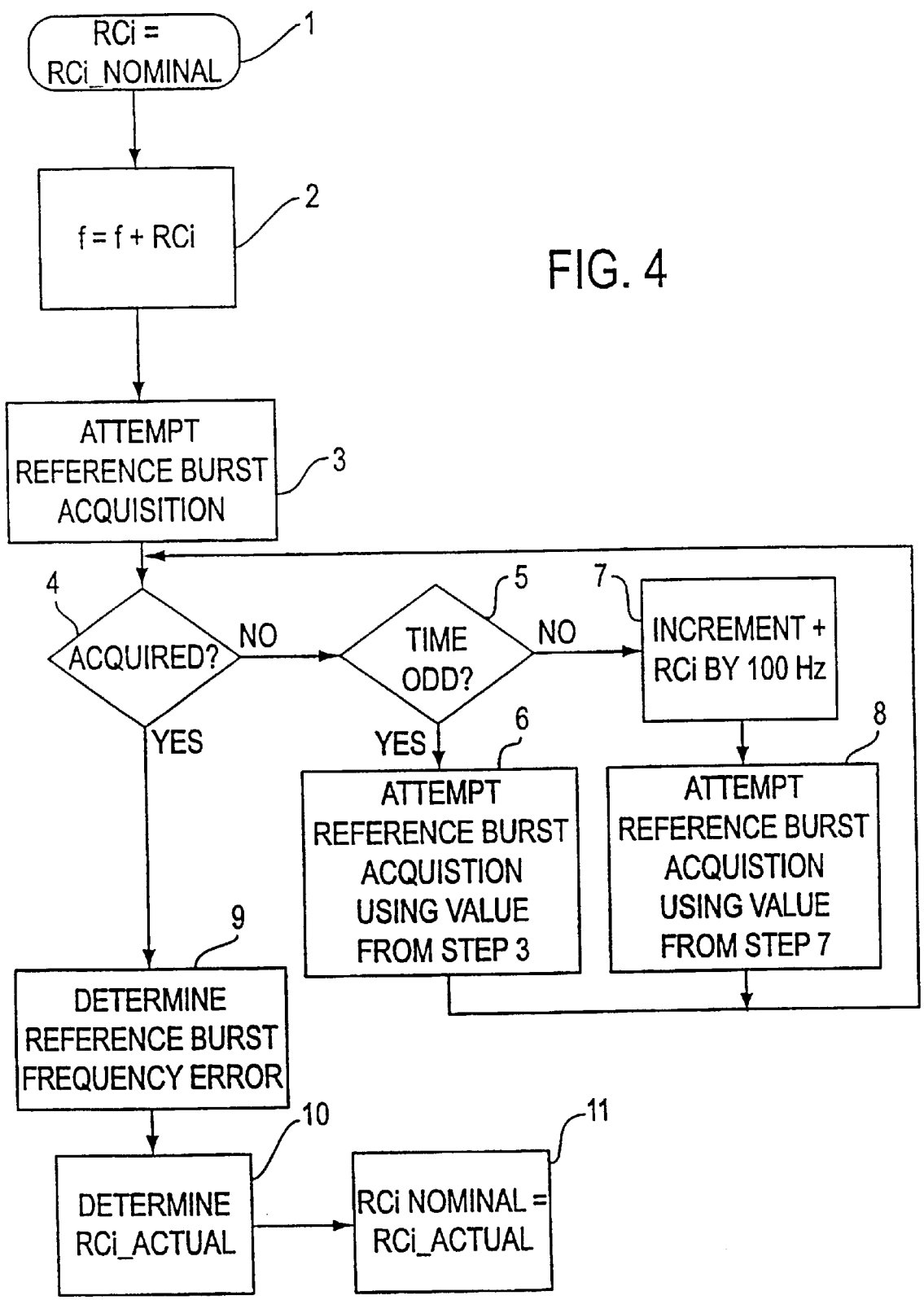
FIG. 4 is a flowchart illustrating the steps associated with receiver (acquisition) initialization according to the present invention.
Figure 5:
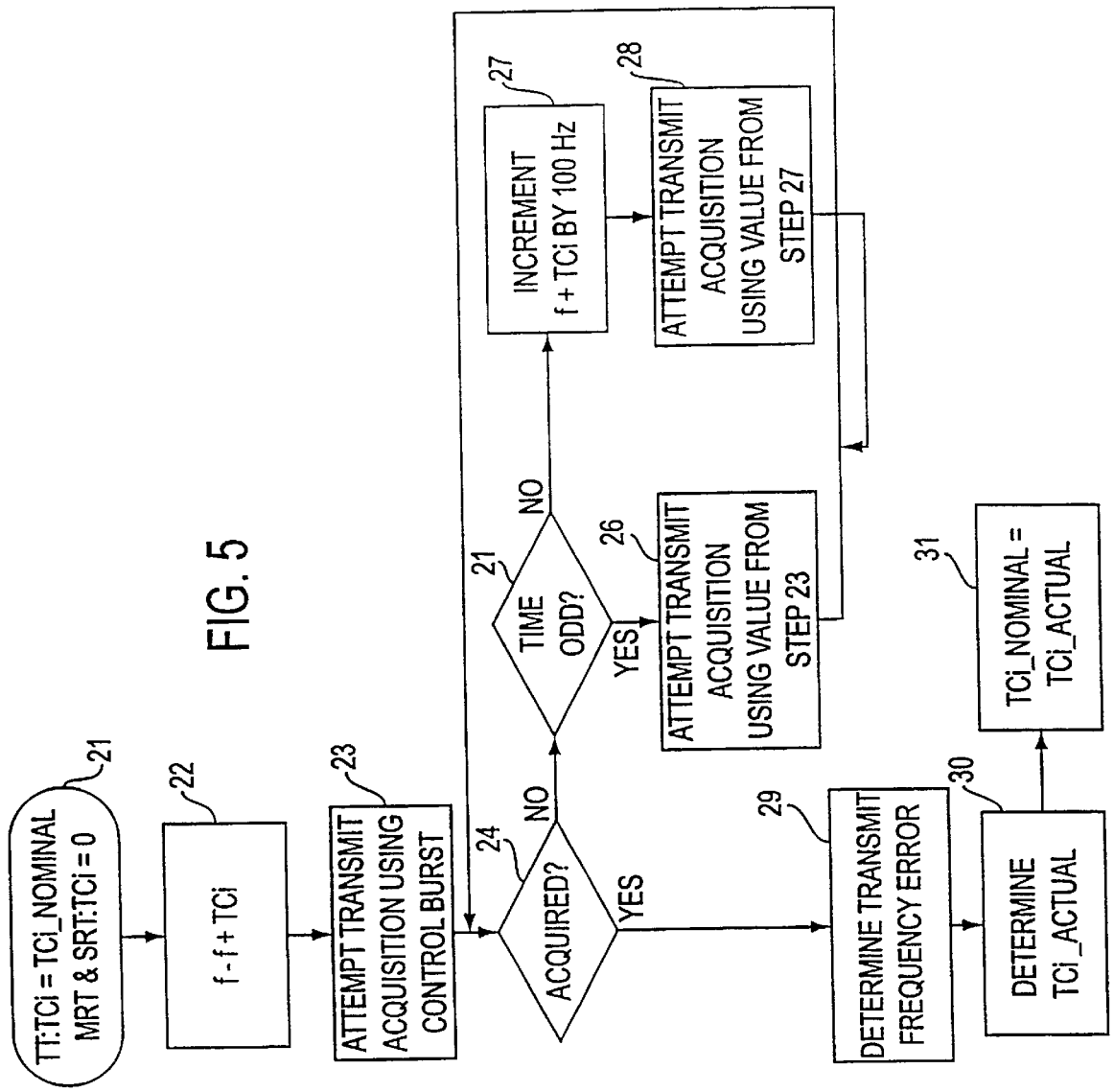
FIG. 5 is a flowchart illustrating the steps associated with transmitter (acquisition) initialization according to the present invention.

The above mentioned rules will now be applied to the systems illustrated in FIGS. 1 and 3 to generate the overall operating method collectively illustrated in FIGS. 4 through 7. The steps presented in FIG. 4 illustrate the initialization of the demodulator in each terminal while the steps presented in FIG. 5 illustrate the initialization of the modulator in each terminal. Moreover, the steps presented in FIGS. 6 and 7 outline the various steps for operating various terminals during normal operation.

As illustrated in FIG. 4, the initial receive acquisition subroutine is performed in the following manner. During Step 1, terminal 10 initializes RCi to RCi_nominal. During Step 2, the terminal 10 sets the demodulator (receive) frequency to (f+RCi_nominal), so that the frequency error measured by the demodulator at terminal "i" when receiving a Reference Burst is approximately 0, i.e., when terminal 10 starts its operation in the receive acquisition mode to thereby search for the Reference Burst during Step 3. Advantageously, RCi_nominal is a value saved in a local database located within terminal 10.

During Step 4, a determination is made as to whether or not the receiver has acquired the Reference Burst. When the answer is negative, parallel processing is commenced to actively search for the Reference Burst. For example, if receiver acquisition is not achieved, RCi beneficially is changed by 100 Hz at every even second. In an exemplary case, RCi advantageously can be sweep over the range between −10 KHz and +10 KHz, although other ranges, including other frequency ranges, can be used. On every alternate attempt, i.e., at every odd second, the value RCi_nominal shall be used for receive acquisition sampling. Thus, during Step 5, a determination is made whether time, in seconds, is odd. When the answer is affirmative, the receiver operates at f+RCi during Step 6; when the answer is negative, the value f+RCi is incremented/decremented by 100 Hz during Step 7 and the receiver operates at the new frequency value during Reference Burst acquisition testing at Step 8. Then, a determination is made as to whether the Reference Burst has been acquired by jumping back to Step 4. Thus, when the answer is negative, Steps 5–8 are repeated. When the answer is affirmative, the method advances to Step 9.

During Step 9, the demodulator in terminal 10 advantageously determines the difference between the actual frequency of the Reference Burst and the programmed frequency, i.e., f+RCi. During Step 10, the actual value of RCi_actual for terminal "i" is determined and, during Step 11, RCi_nominal advantageously is replaced by RCi_actual.

As illustrated in FIG. 5, during Step 21, transmit acquisition starts by initializing the value TCi to a value TCi_nominal. It will be appreciated that TCi_nominal preferably is a value saved in a local database from the previous operation of the terminal 200/400, although TCi_nominal advantageously can be a predetermined constant. Moreover, it will be appreciated that for both the MRT 400 and SRT 500, the value of TCi advantageously can be permanently set to 0.

More specifically and still referring to FIG. 5, the initial transmit acquisition subroutine is performed in the following manner. During Step 21, terminal 20 initializes TCi to TCi_nominal. During Step 22, the terminal 10 sets the modulator (transmit) frequency to (f+TCi_nominal), so that the frequency error measured by the demodulator at terminal "j" when receiving a Control Burst is approximately 0, i.e., when terminal 200 starts its operation in the transmit acquisition mode to thereby search for the Control Burst during Step 23. Advantageously, TCi_nominal is a value saved in a local database located within terminal 10.

During Step 24, a determination is made as to whether or not the MRT has acquired the Control Burst. When the answer is negative, parallel processing is commenced to actively search for a frequency suitable for transmission to the MRT. For example, if transmit acquisition is not achieved, TCi beneficially is changed by 100 Hz at every even second. In an exemplary case, TCi advantageously can be sweep over the range between −10 KHz and +10 KHz, although other ranges, including other frequency ranges, can be used. On every alternate attempt, i.e., at every odd second, the value TCi_nominal shall be used for transmit acquisition initialization. Thus, during Step 25, a determination is made whether time, in seconds, is odd. When the answer is affirmative, the transmit frequency is set to operate at f+RCi during Step 26; when the answer is negative, the value f+TCi is incremented/decremented by 100 Hz during Step 27 and the modulator (transmitter) operates at the new frequency value during transmit acquisition initialization at Step 28. Then, a determination is made as to whether the Control Burst has been acquired by jumping back to Step 24. Thus, when the answer is negative, Steps 25–28 are repeated. When the answer is affirmative, the method advances to Step 29.

During Step 29, the modulator in terminal 100 advantageously determines the difference between the actual frequency of the Control Burst received by MRT and fed back to the terminal 100 and the programmed frequency, i.e., f+TCi. During Step 20, the actual value of TCi_actual for terminal "i" is determined and, during Step 31, TCi_nominal advantageously is replaced by TCi_actual. It should be mentioned that although the steps of FIG. 5 are set forth in terms of Control Bursts, other signal burst advantageously can be used in place of, or in addition to, Control Bursts; all such variations are considered to be within the scope of the present invention.

Figure 6:
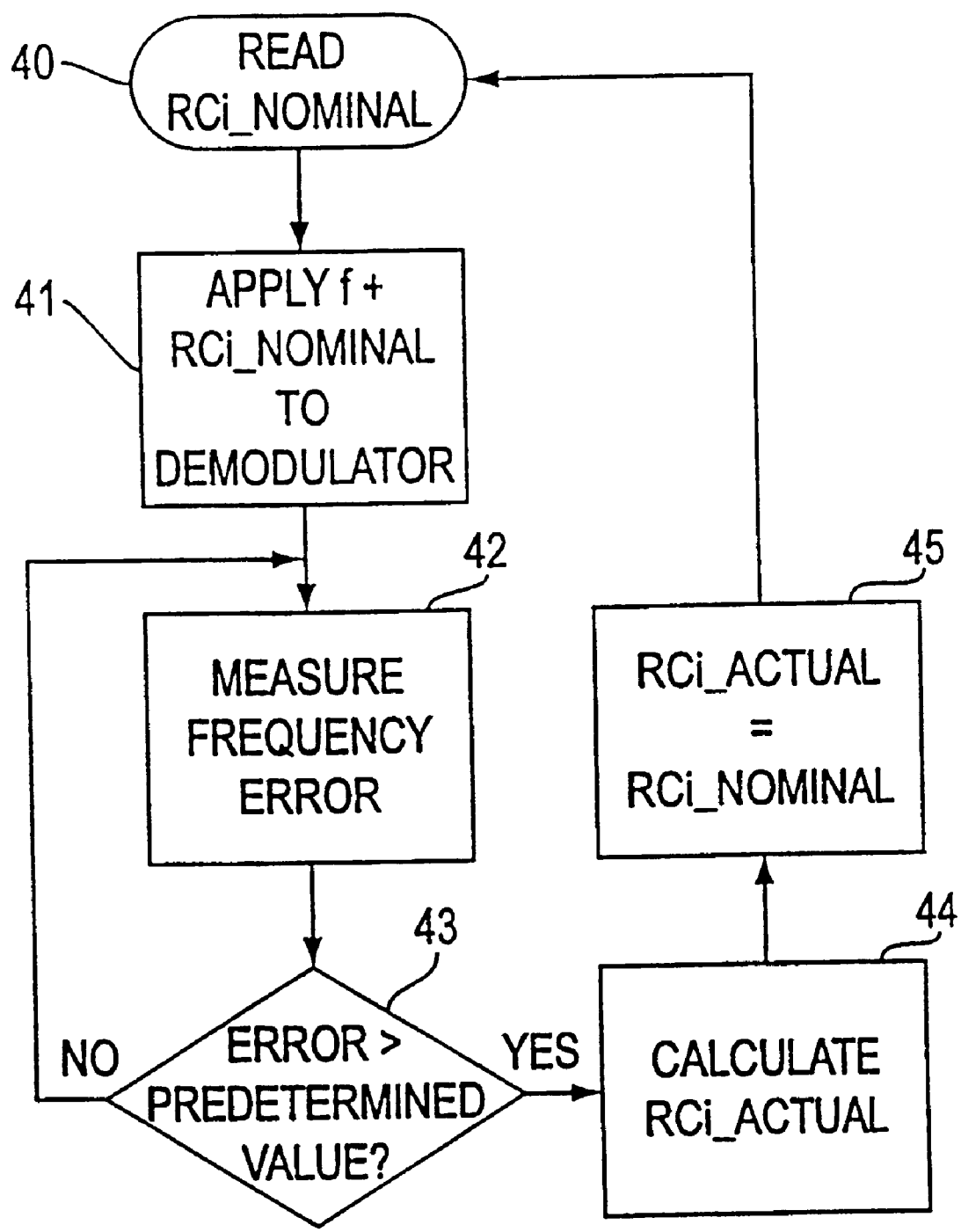
FIG. 6 is a flowchart illustrating the steps associated with receiver operation according to the present invention.

FIG. 6 illustrates the steps associated with the receive operations during a normal mode of operation. More specifically, the following procedures advantageously can be followed by a terminal 100 while it is synchronized on its receive side.

1. For a burst at nominal frequency f, the demodulator frequency shall be programmed to f+RCi.
2. RCi advantageously can be adjusted for every successfully received reference burst, if the error reported by the demodulator is greater than a small threshold, e.g., 10 Hz. It will be appreciate that other threshold values advantageously can be employed in determining when RCi adjustment is warranted. For example, the error advantageously can be accumulated; RCi adjustment would not take place until an accumulated value or running average exceeds a predetermine value, thereby limiting corrections for true frequency drifts rather than spurious burst errors.
3. The current value of RCi shall be saved in the RCi_nominal parameter in non-volatile memory whenever its value changes.

More specifically, during Step 40 the receiver circuitry reads a value RCi stored in non-volatile memory and outputs a demodulator frequency f+RCi, which is applied to the demodulator during step 41. Then, at Step 42, the demodulator determines the frequency error and a compares the error to a predetermined value, e.g., 10 Hz, during Step 43. When the error is greater than the predetermined value, the value RCi is corrected in response to the error value generated by the demodulator during Step 44 and, then, stores the corrected RCi value in memory in place of the previously stored RCi value during Step 45. The routine then jumps to Step 40. When the error value is less than the predetermined value, the method jumps back to repeat Step 42 and subsequent steps.

Figure 7:
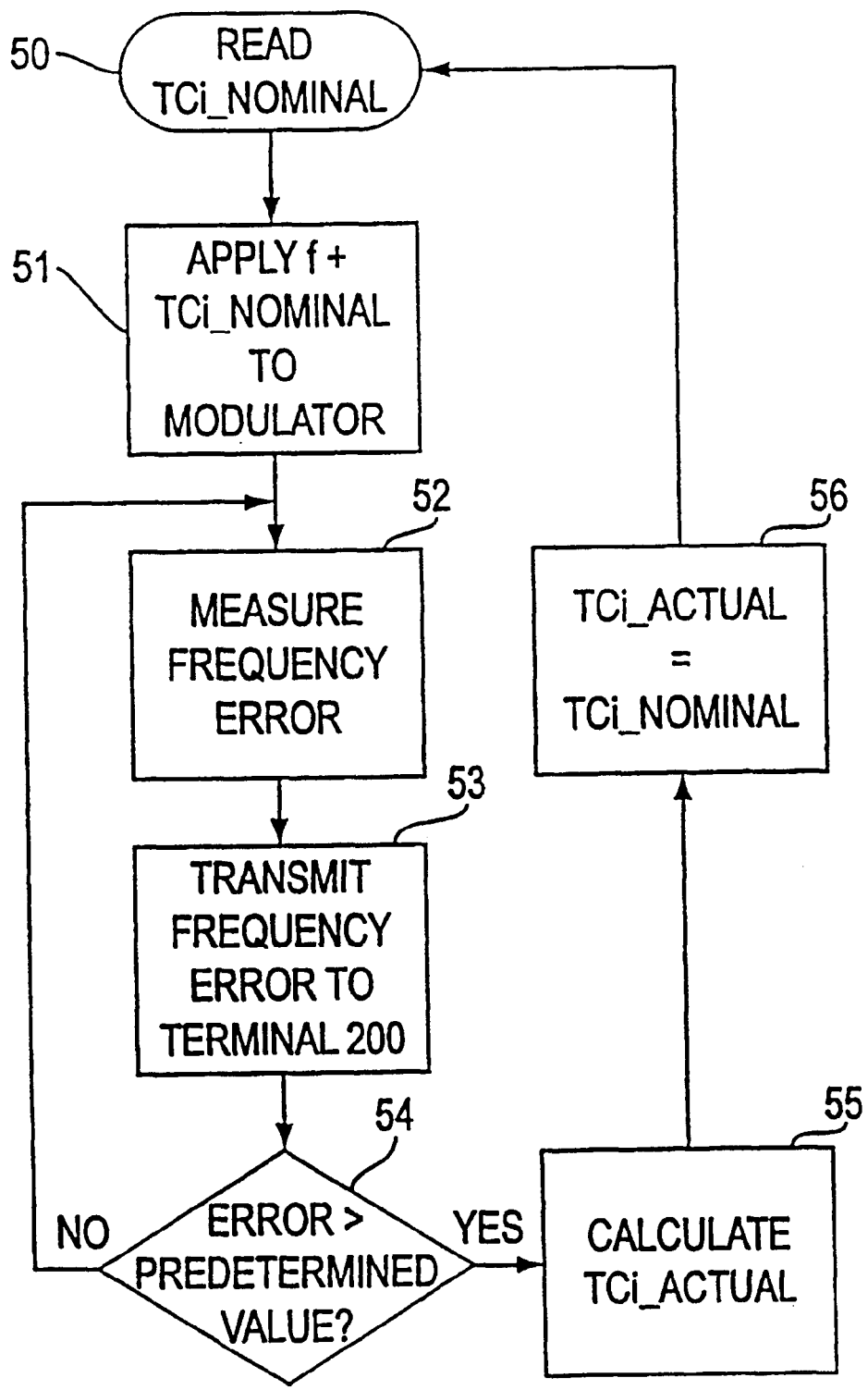
FIG. 7 is a flowchart illustrating the steps associated with transmitter operation according to the present invention.

FIG. 7 illustrates the steps associated with the transmit operations during a normal mode of operation. More specifically, the following procedures beneficially can be followed by a terminal while it is synchronized on its transmit side.

1. For a burst a nominal frequency f, the modulator frequency shall be programmed to f+TCi.
2. Preferably, TCi advantageously can be corrected whenever a correction value is received from the Reference Terminal, as a result of sending a Control Burst and the correction value is larger than a small threshold, e.g., 10 Hz. It will be appreciated that other values can be employed in determining the point at which TCi correction becomes warranted.
3. The current value of TCi shall be saved in the TCi__nominal parameter in non-volatile memory whenever its value changes.
4. As previously mentioned, for an MRT or SRT, the value of TCi advantageously can be permanently set to 0.

More specifically, during Step 50 the transmit circuitry reads a value TCi__nominal stored in non-volatile memory and outputs a modulator frequency f+TCi__nominal, which is applied to the modulator during step 51. Then, at Step 52, the demodulator in one of the MRT or SRT determines the frequency error and transmits the frequency error back to the terminal during Step 53. The terminal 200 a compares the error to a predetermined value, e.g., 10 Hz, during Step 54. When the error is greater than the predetermined value, the value TCi is corrected in response to the error value generated at Step 52 during Step 55 and, then, stores the corrected TCi value in memory in place of the previously stored RCi value during Step 56. The routine then jumps to Step 50. When the error value is less than the predetermined value, the method jumps back to repeat Step 52 and subsequent steps. Thus, whenever an Acquisition or Control burst is received from a terminal 200 at MRT 400 or SRT 500, the burst frequency error advantageously is measured and reported to the respective originating terminal. It should also be mentioned that for each of MRT 400 or SRT 500, the value of TCi is preferably set to 0 permanently.

Although the preferred embodiments according to the present invention have been discussed with respect to a single satellite transponder, the present invention is equally applicable to multiple satellite transponder communication systems. Thus, if multiple satellite transponders are used, with possibly multiple up/down converters at each terminal, then the novel method according to the present invention is executed independently for each transponder.

It should be mentioned that although one configuration of the frequency measurement circuit was discussed above with respect to FIGS. 8 and 9, the present intention is not limited to the circuitry discussed herein. Stated another way, all communication systems capable of carrying out the methods and algorithms discussed above and/or claimed below are considered to fall squarely within the scope of the present invention.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for measurement and reduction of frequency offsets in a communications network including a master reference terminal and a terminal exchanging reference and control bursts, comprising steps for:

adjusting demodulator frequency in the terminal responsive to a first frequency error between a first nominal frequency value and a respective reference burst received by the terminal; and adjusting modulator frequency at the terminal responsive to a second frequency error between a second nominal frequency value and a control burst generated by the terminal and transmitted to the master reference terminal.

2. The method for measurement and reduction of frequency offsets in a communications network as recited in claim 1, wherein said step for adjusting demodulator frequency comprises steps for:

programming the demodulator frequency to f+RC__nominal, determining the first frequency error between the frequency of a received reference burst and said demodulator frequency;

when the first frequency error is less than a predetermined value, repeating said determining step using the next received reference burst;

when the first frequency error exceeds a predetermined value, ascertaining a RC__actual value; and replacing RC__nominal with the RC__actual value, where
f is the nominal frequency of a carrier, and
RC is the receive frequency correction factor at the terminal.

3. The method for measurement and reduction of frequency offsets in a communications network as recited in claim 1, wherein said step for adjusting said modulator frequency comprises steps for:

programming the modulator frequency to f+TC__nominal;

determining the second frequency error between the frequency of a received control burst and said demodulator frequency at the master reference terminal, transmitting the second frequency error from the master reference terminal to the terminal;

when the second frequency error is less than a predetermined value, repeating said determining step using the next control burst received by the master reference terminal;

when the second frequency error exceeds a predetermined value, ascertaining a TC__actual value; and replacing TC__nominal with the TC__actual value, where
f is the nominal frequency of a carrier, and
TC__nominal is the transmit frequency correction factor at the terminal.

4. The method for measurement and reduction of frequency offsets in a communications network as recited in claim 1, wherein said step for adjusting demodulator frequency comprises steps for:
  programming the demodulator frequency to f+RC_nominal;
  determining the first frequency error between the frequency of a received reference burst and said demodulator frequency,
  when the first frequency error is less than a predetermined value, repeating said determining step using the next received reference burst;
  when the first frequency error exceeds a predetermined value, ascertaining a correction value for RC_nominal; and
  adjusting RC_nominal by said correction value, where
    f is the nominal frequency of a carrier, and
    RC is the receive frequency correction factor at the terminal.

5. The method for measurement and reduction of frequency offsets in a communications network as recited in claim 1, wherein said step for adjusting said modulator frequency comprises steps for:
  programming the modulator frequency to f+TC_nominal;
  determining the second frequency error between the frequency of a received control burst and said demodulator frequency at the master reference terminal;
  transmitting the second frequency error from the master reference terminal to the terminal;
  when the second frequency error is less than a predetermined value, repeating said determining step using the next control burst received by the master reference terminal;
  when the second frequency error exceeds a predetermined value, ascertaining a correction value for TC_nominal; and
  adjusting TC_nominal by said correction value, where
    f is the nominal frequency of a carrier, and
    TC is the transmit frequency correction factor at the terminal.

6. The method for measurement and reduction of frequency offsets in a communications network as recited in claim 1, wherein:
  the terminal comprises N terminals, where N is an integer greater than 1; and
  the communications network includes at least one satellite operatively coupling the master reference terminal to the N terminals; and
  the method comprises steps for:
    adjusting the demodulator frequency in the Nth terminal responsive to a first frequency error between a first nominal frequency value and a respective reference burst received by the Nth terminal; and
    adjusting the modulator frequency at the Nth terminal responsive to a second frequency error between a second nominal frequency value and a control burst generated by the Nth terminal, received at the master reference terminal and transmitted to the Nth terminal.

7. The method for measurement and reduction of frequency offsets in a communications network as recited in claim 1, further comprising steps for:
  initialing the demodulator frequency by alternately preforming the steps of:
    attempting to acquire the reference burst with the demodulator frequency set to f+RC_nominal; and
    attempting to acquire the reference burst with the demodulator frequency set in the frequency range of f_M, where said frequency value is varied by R after each attempt to acquire the reference burst, wherein:
      M and R are positive integers greater than 1;
      M is much greater than R;
      f is the nominal frequency of a carrier, and
      RC is the receive frequency correction factor at the terminal.

8. The method for measurement and reduction of frequency offsets in a communications network as recited in claim 7, wherein M is approximately 10,000 Hz and R is approximately 100 Hz.

9. The method for measurement and reduction of frequency offsets in a communications network as recited in claim 1, further comprising steps for:
  initialing the modulator frequency by alternately preforming the steps of:
    attempting to acquire the control burst in the master reference terminal with the modulator frequency set to f+TC_nominal in the terminal; and
    attempting to acquire the control burst in the master reference terminal with the modulator frequency set in a frequency range of f_M, where said frequency value is varied by R after each attempt to acquire the control burst, wherein:
      M and R are positive integers greater than 1;
      M is much greater than R;
      f is the nominal frequency of a carrier; and
      TC is the transmit frequency correction factor at the terminal.

10. The method for measurement and reduction of frequency offsets in a communications network as recited in claim 9, wherein M is approximately 10,000 Hz and R is approximately 100 Hz.

11. A method for measurement and reduction of frequency offsets in a communications network including a master reference terminal and N terminals exchanging reference and control bursts via a satellite, where N>1, comprising steps for:
  adjusting demodulator frequency in the Nth terminal responsive to a first frequency error between a first nominal frequency value and a respective reference burst received by the Nth terminal;
  determining a second frequency error between a second nominal frequency value and a control burst, said second frequency error being generated by the master reference terminal; and
  adjusting modulator frequency at the Nth terminal responsive to said second frequency error.

12. The method for measurement and reduction of frequency offsets in a communications network as recited in claim 11, wherein said step for adjusting demodulator frequency comprises steps for:
  programming the demodulator frequency to f+RCn_nominal;
  determining said first frequency error between the frequency of a received reference burst and said demodulator frequency;
  when said first frequency error is less than a predetermined value, repeating said determining step using the next received reference burst;
  when said first frequency error exceeds a predetermined value, ascertaining a RCn_actual value; and
  replacing RCn_nominal with the RCn_actual value, where f is the nominal frequency of a carrier, and RCn denotes the receive frequency correction factor at the Nth terminal.

13. The method for measurement and reduction of frequency offsets in a communications network as recited in claim 11, wherein said step for adjusting said modulator frequency comprises steps for:

programming the modulator frequency to f+TCn__nominal;

determining said second frequency error between the frequency of a received control burst and said demodulator frequency at the master reference terminal;

transmitting said second frequency error from the master reference terminal to the Nth terminal;

when said second frequency error is less than a predetermined value, repeating said determining step using the next control burst received by the master reference terminal;

when said second frequency error exceeds a predetermined value, ascertaining a TCn__actual value; and replacing TCn__nominal with the TCn__actual value, where f is the nominal frequency of a carrier, and TCn denotes the transmit frequency correction factor at the Nth terminal.

14. The method for measurement and reduction of frequency offsets in a communications network as recited in claim 11, wherein said step for adjusting demodulator frequency comprises steps for:

programming the demodulator frequency to f+RCn__nominal;

determining said first frequency error between the frequency of a received reference burst and said demodulator frequency;

when said first frequency error is less than a predetermined value, repeating said determining step using the next received reference burst;

when said first frequency error exceeds a predetermined value, ascertaining a correction value for RCn__nominal; and adjusting RCn__nominal by said correction value, where f is the nominal frequency of a carrier, and RCn denotes the receive frequency correction factor at the Nth terminal.

15. The method for measurement and reduction of frequency offsets in a communications network as recited in claim 11, wherein said step for adjusting said modulator frequency comprises steps for:

programming the modulator frequency to f+TCn__nominal;

determining said second frequency error between the frequency of a received control burst and said demodulator frequency at the master reference terminal;

transmitting said second frequency error from the master reference terminal to the terminal;

when said second frequency error is less than a predetermined value, repeating said determining step using the next control burst received by the master reference terminal;

when said second frequency error exceeds a predetermined value, ascertaining a correction value for TCn__nominal; and adjusting TCn__nominal by said correction value, where f is the nominal frequency of a carrier, and TCn denotes the transmit frequency correction factor at the Nth terminal.

16. The method for measurement and reduction of frequency offsets in a communications network as recited in claim 11, further comprising steps for:

initialing said demodulator frequency by alternately preforming the steps of:

attempting to acquire the reference burst with the demodulator frequency set to f+RCn__nominal; and attempting to acquire the reference burst with the demodulator frequency set in a frequency range of f__M, where said frequency value is varied by R after each attempt to acquire the reference burst, wherein:

M and R are positive integers greater than 1;

M is much greater than R;

f is the nominal frequency of a carrier, and

RCn denotes the receive frequency correction factor at the Nth terminal.

17. The method for measurement and reduction of frequency offsets in a communications network as recited in claim 16, wherein M is approximately 10,000 Hz and R is approximately 100 Hz.

18. The method for measurement and reduction of frequency offsets in a communications network as recited in claim 11, further comprising steps for:

initialing the modulator frequency by alternately preforming the steps of:

attempting to acquire the control burst in the master reference terminal with the modulator frequency set to f+TCn__nominal in the Nth terminal; and attempting to acquire the control burst in the master reference terminal with the modulator frequency set in a frequency range of f__M, where said frequency value is varied by R after each attempt to acquire the control burst, wherein:

M and R are positive integers greater than 1;

M is much greater than R;

f is the nominal frequency of a carrier; and

TCn denotes the transmit frequency correction factor at the Nth terminal.

19. The method for measurement and reduction of frequency offsets in a communications network as recited in claim 18, wherein M is approximately 10,000 Hz and R is approximately 100 Hz.

20. A method for measurement and reduction of frequency offsets in a communications network including a master reference terminal, a second reference terminal, and N terminals exchanging reference and control bursts via a satellite, where N>1, comprising steps for:

adjusting demodulator frequency in the Nth terminal responsive to a first frequency error between a first nominal frequency value and a respective reference burst received by the Nth terminals;

determining a second frequency error between a second nominal frequency value and a control burst, said second frequency error being generated by one of the master reference terminal and the second reference terminal; and adjusting modulator frequency at the Nth terminal responsive to said second frequency error.

21. The method for measurement and reduction of frequency offsets in a communications network as recited in claim 20, wherein said step for adjusting demodulator frequency comprises steps for:

programming the demodulator frequency to f+RCn__nominal;

determining said first frequency error between the frequency of a received reference burst and said demodulator frequency;

when said first frequency error is less than a predetermined value, repeating said determining step using the next received reference burst;

when said first frequency error exceeds a predetermined value, ascertaining a RCn_actual value; and replacing RCn_nominal with the RCn_actual value, where f is the nominal frequency of a carrier, and RCn denotes the receive frequency correction factor at the Nth terminal.

22. The method for measurement and reduction of frequency offsets in a communications network as recited in claim 20, wherein said step for adjusting said modulator frequency comprises steps for:

programming the modulator frequency to f+TCn_nominal;

determining said second frequency error between the frequency of a received control burst and said demodulator frequency at one of the master reference terminal and the secondary reference terminal;

transmitting said second frequency error to the Nth terminal;

when said second frequency error is less than a predetermined value, repeating said determining step using the next control burst received by one of the master reference terminal and the secondary reference terminal;

when said second frequency error exceeds a predetermined value, ascertaining a TCn_actual value; and replacing TCn_nominal with the TCn_actual value, where f is the nominal frequency of a carrier, and TCn denotes the transmit frequency correction factor at the Nth terminal.

23. The method for measurement and reduction of frequency offsets in a communications network as recited in claim 20, wherein said step for adjusting demodulator frequency comprises steps for:

programming the demodulator frequency to f+RCn_nominal;

determining said first frequency error between the frequency of a received reference burst and said demodulator frequency;

when said first frequency error is less than a predetermined value, repeating said determining step using the next received reference burst;

when said first frequency error exceeds a predetermined value, ascertaining a correction value for RCn_nominal; and adjusting RCn_nominal by said correction value, where f is the nominal frequency of a carrier, and RCn denotes the receive frequency correction factor at the Nth terminal.

24. The method for measurement and reduction of frequency offsets in a communications network as recited in claim 20, wherein said step for adjusting said modulator frequency comprises steps for:

programming the modulator frequency to f+TCn_nominal;

determining said second frequency error between the frequency of a received control burst and said demodulator frequency at one of the master reference terminal and the secondary reference terminal;

transmitting said second frequency error to the Nth terminal;

when said second frequency error is less than a predetermined value, repeating said determining step using the next control burst received by one of the master reference terminal and the secondary reference terminal;

when said second frequency error exceeds a predetermined value, ascertaining a correction value for TCn_nominal; and adjusting TCn_nominal by said correction value, where f is the nominal frequency of a carrier, and TCn denotes the transmit frequency correction factor at the Nth terminal.

25. A communications network including a master reference terminal and a terminal exchanging reference and control bursts via a communications channel and having means for measuring and reducing frequency offsets in said terminal of the communications network, wherein a demodulator frequency of said terminal is determined based on a first frequency error between the reference burst and a nominal frequency value determined by said terminal and a modulator frequency of said terminal is established responsive to a second frequency error generated by said master reference terminal with respect to the control burst.

26. The communications network as recited in claim 25, wherein said communications channel comprises a satellite.

27. The communications network as recited in claim 25, wherein initial values of said demodulator frequency and said modulator frequency of said terminal are determined by said means by stepping through a predetermined range of offset values.

28. The method for measurement and reduction of frequency offsets in a is communications network as recited in claim 1, wherein said reference burst is unmodulated.

29. The communications network as recited in claim 25, wherein said reference burst is unmodulated.

* * * * *